3,405,132
N - [OMEGA - (2 - AMINO - ALPHA PHEN-
YLBENZYLIDENEAMINO)C₂–C₃ ALKYL-
ENE] MORPHOLINES
Stanley C. Bell, Penn Valley, Pa., assignor to American
Home Products Corporation, New York, N.Y., a corporation of Delaware
No Drawing. Application July 25, 1963, Ser. No. 297,705,
which is a continuation-in-part of application Ser. No.
211,003, July 27, 1962. Divided and this application
Aug. 8, 1966, Ser. No. 570,713
8 Claims. (Cl. 260—247.2)

This is a divisional application of my co-pending application, Ser. No. 297,705, filed July 25, 1963, which is in turn, a continuation-in-part of my previous application, Ser. No. 213,003, filed July 27, 1962, both now abandoned.

This invention relates to new 2-aminobenzylideneamines. More particularly, it is concerned with substituted 2-amino-α-substituted-benzylideneamines, salts and geometric isomers thereof.

The substituted 2-aminobenzylideneamines disclosed herein possess valuable pharmacological properties. They are effective as anticonvulsants, as sedatives and as muscle relaxants. Owing to the foregoing properties, to their slight toxicity and to the low incidence of side effects attending their administration, the compounds of this invention are very valuable in veterinary medicines.

The pharmacologically active compounds of this invention may be administered parenterally or orally in conventional dosage forms such as tablets, powders, injectables, etc.

The compounds of the invention are represented by the following general formula:

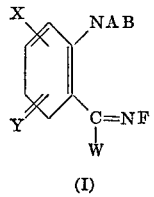

(I)

wherein:
X and Y are selected from the group consisting of hydrogen, halogen, nitro, lower alkyl, preferably having up to 9 carbon atoms in the chain and halo(lower)alkyl having up to 2 carbon atoms such as trifluoromethyl; A is selected from the group consisting of hydrogen, lower alkyl, lower acyl, halo(lower)acyl and aralkyl having up to 7 carbon atoms; B is hydrogen or lower alkyl; F is a radical selected from the group consisting of (lower)alkyl, lower aralkyl, hydroxy(lower)alkyl, alkoxyalkyl, diallkoxyalkyl, mercapt from the group consisting of loweralkyl, lower aralkyl -o hydroxyl(lower)alkyl, alkoxyalkyl, dialkoxyalkyl, mercapto alkyl, in which the alkyl and alkoxy groups have up to 2 carbon atoms, aminoalkyl having up to 7 carbon atoms, and alkylthioalkyl having up to 3 carbon atoms; W is a member selected from the group consisting of the lower alkyl and aryl radicals such as methyl, phenyl, 2-furyl, or 2-thienyl. Compounds where W is phenyl substituted by halogen, lower alkoxy, lower alkyl, or halo (lower)alkyl are full equivalents of the subject matter to be patented.

The compounds of the invention may be prepared by the method illustrated schematically below.

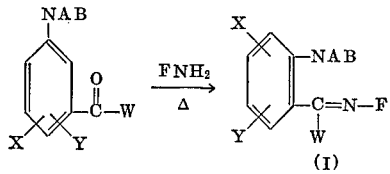

(I)

In carrying out the process, an approximately substituted phenone is condensed by heating with a suitably substituted primary amine. Optionally, the process may be carried bout in an inert solvent such as xylene, toluene or hexanol and if desired, with a catalytic amount of an acid catalyst such as zinc chloride or toluene-sulfonic acid. Upon cooling, water is added to the mixture to precipitate the product which can be purified by crystallizing from a water-alcohol mixture and then from a benzene-hydrocarbon mixture. In the special case where the amine reagent is benzylamine, the product is ordinarily a mixture of N-(2-amino-5-chloro-α-phenylbenzylidene) benzylamine and of its tautomer, N-(2-amino-5-chloro-α-phenylbenzyl) benzaldehyde imine.

The process as above described leads to the possible production of two geometric isomers (α and β forms) because of the formation of a carbon-nitrogen double bond. Where both isomers are stable and isolable, the present invention naturally comprehends both forms. Separation of the α- from the β-isomers can be achieved by known techniques, such as fractional crystallization.

The following specific examples in which all temperatures are in degrees centigrade serve to illustrate the invention.

Example 1

A mixture of 3.0 g. of 2-amino-5-chlorobenzophenone and 30 ml. of ethanolamine is refluxed for 4 hours. Upon cooling, the reaction mixture is diluted with water and the product that separates is recrystallized from water-alcohol and then benzene-cyclohexane to give pure 2-(2-amino-5-chloro-α-phenylbenzylideneamino) ethanol, M.P. 122–124°.

Analysis for $C_{15}H_{15}ClN_2O$: C, 65.56; H, 5.50; N, 10.20; Cl, 12.90; M.W. 274.75. Found: C, 65.55; H, 5.44; N, 10.40; Cl, 12.90.

Example 2

3-morpholinopropylamine is reacted with 2-methylamino-5-chlorobenzophenone according to the procedure of Example 1 to give 4-[3-(2-methylamino-5-chloro-α-phenylbenzylideneamino)propyl]morpholine.

Example 3

2-amino-5-chlorophenyl-2-thienyl ketone is reacted with 2-2-morpholinoethylamine according to the procedure of Example 1 to give 4-(-[2-amino-5-chloro-α-(2-thienyl) benzylideneamino]ethyl)morpholine.

Example 4

A solution of 3-(2-amino-5-chloro-α-phenylbenzylideneamino)propanol in pyridine was treated with acetic anhydride and the reaction mixture then diluted with water. The resultant precipitate was filtered giving 3-(2-acetamido-5-chloro - α - phenylbenzylideneamino)propyl acetate, M.P. 122–124°.

Analysis.—Calcd. for $C_{20}H_{21}ClN_2O_3$: C, 64.42; H, 5.81; N, 7.52; Cl, 9.51. Found: C, 64.77; H, 5.73; N, 7.79; Cl, 9.70.

Example 5

A solution of 23.1 g. of 2-amino-5-chlorobenzophenone and 45 g. of 4-(2-aminoethyl)morpholine in 100 ml. of xylene and a catalytic amount of zinc chloride was refluxed for 3 hours until the theoretical amount of water had separated out. The solvent was removed in vacuo and the residue recrystallized from heptane and then ethanol giving the α-isomer of N-[2-(2-amino-5-chloro-α-phenylbenzylideneamino)ethyl]morpholine, M.P. 140–142°.

Analysis.—Calcd. for $C_{19}H_{22}ClN_3O$: C, 66.36; H, 6.45; Cl, 10.32; N, 12.22. Found: C, 66.13; H, 6.29; Cl, 10.40; N, 12.09.

The above heptane filtrate was concentrated to a small volume and the solid that precipitated out was recrystallized from cyclohexane and then alcohol-water giving the β-form of N-[2-(2-amino-5-chloro-α-phenylbenzylideneamino ethyl]morpholine, M.P. 112–114° C.

*Analysis.*—Calcd. for $C_{19}H_{22}ClN_3O$: C, 66.36; H, 6.45; Cl, 10.32; N, 12.22. Found: C, 66.17; H, 6.50; Cl, 10.35; N, 12.4.

Example 6

2-amino-5-chlorobenzophenone was reacted with 4-(3-aminopropyl)morpholine according to procedure of Example 5 to give the α- and β-isomers of N-[3-(2-amino-5-chloro-α-phenylbenzylideneamino)propyl]morpholine.

*Analysis.*—Calcd. for $C_{20}H_{24}ClN_3O$: C, 67.12; H, 6.76; Cl, 9.90; N, 11.75. α-Isomer, M.P. 91–92°. Found: C, 67.23; H, 6.76; Cl, 9.84; N, 11.94. β-Isomer, M.P. 118–119°. Found: C, 67.36; H, 6.79; Cl, 9.94; N, 11.85.

Example 7

5-chloro-2-methylaminobenzophenone was reacted with 4-(2-aminoethyl)morpholine according to the procedure of Example 5 to give the α- and β-isomers of N-[2-(5-chloro - 2 - methylamino - α - phenylbenzylideneamino)ethyl]morpholine.

*Analysis.*—Calcd. for $C_{20}H_{24}ClN_3O$: C, 67.12; H, 6.76; Cl, 9.90; N, 11.74. α-Form, M.P. 100–102° C. Found: C, 66.96; H, 6.65; Cl, 9.90; N, 11.53. β-Form, M.P. 123–125° C. Found: C, 66.84; H, 6.61; Cl, 9.80; N, 11.66.

Example 8

N-[3-(2-amino-5-chloro - α - phenylbenzylideneamino)propyl]morpholine was reacted with chloroacetic anhydride according to the procedure of Example 4 to give N-[3-(2-chloroacetamido)-5 - chloro - α - phenylbenzylideneamino)propyl]morpholine, M.P. 107–109°.

*Analysis.*—Calcd. for $C_{22}H_{25}Cl_2N_3O_2$: C, 60.83; H, 5.80; Cl, 16.33; N, 9.67. Found: C, 60.92; H, 5.85; Cl, 16.30; N, 9.44.

Example 9

N-[2-(2-amino - 5 - chloro-α-phenylbenzylideneamino)ethyl]morpholine was reacted with acetic anhydride according to the procedure of Example 4 to give N-[2-(2-acetamido - 5 - chloro-α-phenylbenzylideneamino)ethyl]morpholine, M.P. 147–149° C.

*Analysis.*—Calcd. for $C_{21}H_{24}ClN_3O_2$: C, 65.30; H, 6.27; Cl, 9.19; N, 10.89. Found: C, 65.34; H, 6.13; Cl, 9.30; N, 10.73.

It will be understood that many changes and variations may be effected in the preparative methods of the invention without departing from the spirit and scope thereof.

What is claimed is:

1. The α-isomer of N-[3-(2-amino-5-chloro-α-phenylbenzylideneamino)propyl]morpholine.
2. The β-isomer of N-[3-(2-amino-5-chloro-α-phenylbenzylideneamino)propyl]morpholine.
3. The α-isomer of N-[2-(2-amino-5-chloro-α-phenylbenzylideneamino)ethyl]morpholine.
4. The β-isomer of N-[2-(2-amino-5-chloro-α-phenylbenzylideneamino)ethyl]morpholine.
5. The α-isomer of N-[2-(5-chloro-2-methylamino-α-phenylbenzylideneamino)ethyl]morpholine.
6. The β-isomer of N-[2-(5-chloro-2-methylamino-α-phenylbenzylideneamino)ethyl]morpholine.
7. N-[3-(2-chloroacetamido - 5 - chloro - α-phenylbenzylideneamino)propyl]morpholine.
8. N-[2-(2-acetamido - 5-chloro-α-phenylbenzylideneamino)ethyl]morpholine.

No references cited.

NICHOLAS S. RIZZO, *Primary Examiner.*

JOSE TOVAR, *Assistant Examiner.*

UNITED STATES PATENT OFFICE
CERTIFICATE OF CORRECTION

Patent No. 3,405,132

October 8, 1968

Stanley C. Bell

It is certified that error appears in the above identified patent and that said Letters Patent are hereby corrected as shown below:

Column 1, line 51, beginning with "hydroxyl" cancel all to and including "aralkyl -o" in line 52, same column 1; same column 1, lines 65 to 70, the left-hand portion of the formula should appear as shown below:

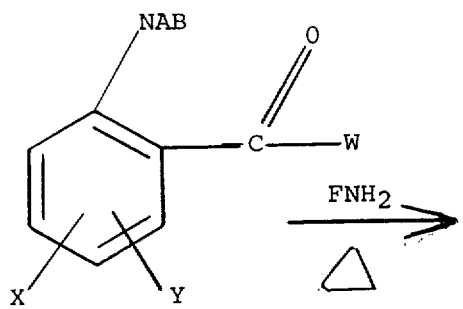

Signed and sealed this 10th day of March 1970.

(SEAL)
Attest:

EDWARD M. FLETCHER, JR.
Attesting Officer

WILLIAM E. SCHUYLER, Jr
Commissioner of Patents